UNITED STATES PATENT OFFICE.

FREDERICK L. HARLEY, OF FOLSOM, PENNSYLVANIA.

METHOD OF TREATING OLD TIRES TO PRODUCE NEW MATERIAL.

1,285,992.     Specification of Letters Patent.     Patented Nov. 26, 1918.

No Drawing.     Application filed January 30, 1918. Serial No. 214,528.

*To all whom it may concern:*

Be it known that I, FREDERICK L. HARLEY, a citizen of United States, residing at Folsom, in the county of Delaware and State of Pennsylvania, have invented new and useful Improvements in Methods of Treating Old Tires to Produce New Material, of which the following is a specification.

The invention relates to a method of treating old or worn-out tires, to derive therefrom various of the substances used in the original manufacture of the tire, whereby to obtain a new material that may be employed for various purposes.

Among other embodiments, the invention comprehends a method for treating old tires, and processing the derived products, whereby there will be produced a material which can be readily adapted to various purposes, as for instance, gaskets, packings, shoe soles, heels, or other forms of products which necessitate the use of a material embodying a fabric or body impregnated with rubber or rubber composition, or the like.

More particularly the method involved is to strip the old tire, whether it be a bicycle or automobile tire, to obtain the fabric which ordinarily forms a part of the tire, said fabric being calendered or treated by the action of heat and compressed with suitable form, and subjected to vulcanization, so that the various parts or ingredients will be firmly pressed and held together, and the resultant product is then subjected to further up-building with a cement or rubber or graphited to obtain a stock that will adapt itself to the purposes mentioned.

Specifically, I take for instance, an automobile tire that has become worn and unfit for further use, and by means of a rotary or other suitable cutter I strip therefrom the solid rubber portion of the carcass of the tire to obtain the underlying fabric, and which will be readily understood is of course impregnated with a certain amount of the rubber that the tire was originally made from. This fabric strip or body is now calendered between heavy rollers to thoroughly compress the rubber remaining therein, causing the fiber and rubber portions to form a unitary flexible product, the fiber body being then passed through flat-press vulcanizers to thoroughly vulcanize the rubber and fiber together. This will result in a flat sheet of the desired product, which may now be cut up or formed into various articles of manufacture, such as packings, gaskets, and the like.

For instance, in building up a high-pressure packing, sheets of the product obtained as above described, are cemented together with raw Pará cement and graphited in any well-known manner, and the waste pieces remaining from the sheet after the packing has been cut therefrom, are now finely ground up and rebuilt by pressure into a kind of stock, that may be spread in any convenient manner over the fabric body previously obtained. This form of construction may now be further vulcanized or cemented to bring the fabric body and ground-up mass into firmer and more unitary relation, and the derived article is then ready and fit to be put to such use as an article of this character is adapted.

I am aware that various methods and processes have been employed heretofore for utilizing certain parts of old and worn tires and the like, but in these instances the purpose is more particularly to derive therefrom the rubber in the carcass; whereas, I particularly employ the fabric body of the carcass to derive my result, and in so doing provide a simple and effective method whereby the desired product can be obtained in a cheap manner, and the ingredients of the old and worn-out article of manufacture are therefore employed to produce a new and special form as for the purposes mentioned.

Having described my invention what I claim is:

1. A method of treating tires to obtain a fabric product, consisting in subjecting a tire carcass to the action of a cutter to strip the rubber portion from the tire carcass to expose the fabric body of the carcass, said fabric body having impregnated therein a part of the rubber composition of the tire carcass, subjecting the fabric body to heavy pressure to thoroughly compress the remaining rubber of the fabric body into the weave of the fabric, vulcanizing the fabric body to unify the rubber portion thereof with the weave of the fabric body, and then combining sheets of the said treated fabric body together by cementing the same with raw Pará cement to form a built-up stock.

2. A method of treating tires to obtain a fabric product, consisting in stripping from the tire carcass the rubber thereof to expose the fabric body, said fabric body being impregnated with particles of rubber, subjecting the fabric body to heat and heavy pressure to thoroughly compress the rubber particles and fabric body and vulcanizing the same together, cutting said fabric body into pieces from said resultant stock, grinding up the waste particles of said resultant stock after the pieces have been cut, and reducing the ground-up particles to a mass and spreading the same over the pieces and pressing the same together to form a built-up stock.

In testimony whereof I affix my signature.

FREDERICK L. HARLEY.